US009865014B2

(12) United States Patent
Codato et al.

(10) Patent No.: US 9,865,014 B2
(45) Date of Patent: Jan. 9, 2018

(54) CUSTOMER TERMINAL AND SELF-SHOPPING SYSTEM (71) Applicant: DATALOGIC IP TECH S.R.L., Lippo di Calderara di Reno (IT)

(72) Inventors: Sandro Codato, Mestre (IT); Paolo Mazzocato, Casier (IT); Marco Lizza, Olmo di Martellago (IT)

(73) Assignee: DATALOGIC IP TECH S.R.L., Calderara di Reno (Bologna) (IT)

( * ) Notice: Subject to any disclaimer, the term of this patent is extended or adjusted under 35 U.S.C. 154(b) by 606 days.

(21) Appl. No.: 14/368,398

(22) PCT Filed: Dec. 21, 2012

(86) PCT No.: PCT/IB2012/057631
§ 371 (c)(1),
(2) Date: Jun. 24, 2014

(87) PCT Pub. No.: WO2013/098749
PCT Pub. Date: Jul. 4, 2013

(65) Prior Publication Data
US 2014/0351056 A1 Nov. 27, 2014

(30) Foreign Application Priority Data

Dec. 28, 2011 (IT) ................. MI2011A2406

(51) Int. Cl.
*G06Q 30/06* (2012.01)
*G06F 11/07* (2006.01)
(Continued)

(52) U.S. Cl.
CPC ..... *G06Q 30/0633* (2013.01); *G06F 11/0742* (2013.01); *G06F 11/0757* (2013.01);
(Continued)

(58) Field of Classification Search
None
See application file for complete search history.

(56) References Cited

U.S. PATENT DOCUMENTS

| 4,744,097 A | 5/1988 | Haruhara |
| 4,906,979 A | 3/1990 | Kimura |

(Continued)

FOREIGN PATENT DOCUMENTS

| EP | 1162583 A1 | 12/2001 |
| EP | 1727049 | 11/2006 |
| WO | WO0195110 A2 | 12/2001 |

OTHER PUBLICATIONS

"Great Watchdogs", Jan. 1, 2011, XP055055247, Retrieved from the Internet: URL:http:www.ganssle.com/watchdogs.htm [retrieved on Mar. 5, 2013].
(Continued)

*Primary Examiner* — Florian Zeender
*Assistant Examiner* — Denisse Ortiz Roman
(74) *Attorney, Agent, or Firm* — Duane Morris LLP (57) ABSTRACT A customer terminal of a "self-scanning shopping" system, which is configured to store at least one shopping session in a non volatile memory, includes a main processor, a product code reader, a location for non volatile storage of an open shopping session indicator and/or an identifier, either direct or indirect, of a shopping session, and a supervisor circuit. In a working operating state, the main processor periodically sends a heartbeat to the supervisor circuit. The supervisor circuit commands a reset of the main processor when, from the lack of receipt of the heartbeat, it detects a non working operating state of the main processor. The main processor, upon reset, checks whether there is an open shopping session based on the contents of said memory location and in the affirmative case restores said shopping session.

9 Claims, 3 Drawing Sheets (51) Int. Cl.
*G07G 1/00* (2006.01)
*G06Q 10/00* (2012.01)
*G06Q 30/02* (2012.01)

(52) U.S. Cl.
CPC ......... *G06F 11/0793* (2013.01); *G06Q 10/20* (2013.01); *G06Q 30/0267* (2013.01); *G07G 1/0009* (2013.01); *G07G 1/0018* (2013.01); *G07G 1/0081* (2013.01)

(56) References Cited

U.S. PATENT DOCUMENTS

| | | | | |
|---|---|---|---|---|
| 7,107,240 | B1* | 9/2006 | Silverman | G06Q 40/00 705/35 |
| 7,870,028 | B2* | 1/2011 | Kloubakov | G06Q 20/20 705/16 |
| 8,788,850 | B1* | 7/2014 | Kaul | G06F 21/558 713/300 |
| 2004/0117268 | A1 | 6/2004 | Grogan et al. | |
| 2004/0267546 | A1 | 12/2004 | Yamada | |
| 2009/0328131 | A1 | 12/2009 | Chaturvedi et al. | |

OTHER PUBLICATIONS

International Search Report and Written Opinion dated Mar. 5, 2013 for PCT/IB2012/057631.
EP Communication dated Feb. 2, 2016 in counterpart European Patent Application No. 12 824 727.7.

* cited by examiner

CUSTOMER TERMINAL AND SELF-SHOPPING SYSTEM

BACKGROUND AND SUMMARY OF THE INVENTION

The present invention relates to a customer terminal and to a "self-shopping" system and more specifically a "self-scanning shopping" system.

In the present description and in the attached claims, under the expression "self-scanning shopping" it is meant to indicate purchase at a self-service shopping site, namely where the customer him/herself collects the desired products from shelves and/or counters, including manned counters, and reads a product code from each product that he/she selects to purchase via a terminal, typically a portable terminal (hand-held mobile computer), to obtain product data typically including the price.

The product data is typically stored in a list; at the end of shopping, the cash slip and the payment are made based on the stored list, except for checks by a cash desk attendant of the shopping site.

There are many advantages of these shopping systems. In this way, the customer is able, amongst other things, to know in real time the price of each product and/or the total price accumulated for the products selected for purchase and, at the end, has no need have to the codes rechecked at the cash desk before payment, avoiding queues at the checkouts. Moreover, the customer can take advantage of his/her fidelity card through dedicated promotional offers. At the shopping site, the shopping history of each customer can also be stored, for example for statistical purposes and/or to make targeted advertisements and promotions. It is also possible to monitor availability on the shelves in real time, particularly of high-consumption products in the peak hours, and restock them in real time.

A self-scanning shopping system is described for example in patent application EP 1162583 A1, on which the preamble of the independent claims is based.

US 2009/0328131 A1 describes a hard reset mechanism of an electronic device, which, upon request of a hard reset, carries out a further check of the user's credentials and makes a backup of the data before carrying out the hard reset. The backup can be made onto a removable memory card of the device or onto a remote device. The Applicant observes that such a mechanism is not suitable for sudden and total hardware blocks, since the processor must still be sufficiently operative to be able to carry out the further check of credentials and the data backup.

US 2004/0117268 A1 describes a system for processing on-line purchase orders, comprising a hub having at least one server and customer, seller, freight attendant and warehouse attendant terminals, including portable terminals. A triple-redundancy backup system is provided, wherein the databases and possible software applications are run simultaneously on at least three systems, as well as a mirror service at a remote location to preserve the data in case of a disaster in the hub or main server. Moreover, the document makes a generic reference to the fact that the data can be stored on the hub and on a subscriber terminal to provide data integrity and backup for the subscriber terminal, so that in the case of a system crash on the subscriber side the information can be recovered by the hub. The document relates to users subscribed to the service and does not disclose either automatic management of hardware and software blocks nor automatic recovery, without the intervention of an attendant, of such backup information and therefore it is totally unsuitable for an environment wherein the users of the portable terminals are occasional and temporary, with practically zero knowledge of the portable terminal as occurs in a "self-scanning shopping" environment.

In the field of "self-scanning shopping" systems of interest here, an important requirement is user friendliness of the customer terminal; moreover, a much felt problem for the customer is the reliability of the terminal. In a "self-scanning shopping" system of the prior art, if a customer terminal blocks, for example due to a malfunction of any kind of the hardware or software, it is necessary to take the terminal back to the checkout or to the terminal distribution point, where a customer care representative re-initializes the terminal or gives another terminal to the customer, with waste of time, loss of efficiency of the system, and lost of customer's trust. Since these are rare events, it is difficult to acquire statistics on the reasons causing the blocks of the terminals, which may be many and varied, and consequently it is difficult to take the appropriate preventive measures.

The technical problem at the basis of the present invention is, in a self-scanning shopping system, to minimize the impact on the customer of a block of the customer terminal, in particular of a hardware block.

In the present description and in the attached claims, under the expression "hardware block" it is meant to indicate a malfunction at the BIOS and/or kernel level of the operating system, as opposed to the expression "software block" with which it is meant to indicate a malfunction of an application, like for example the management of the user interface, the wireless connection with a remote device, etc.

The Applicant has recognised that the aforementioned problem can be solved with automatic detection of such a block and a consequent automatic reset or "re-boot" of the operating system of the customer terminal.

It should be emphasised that in known applications—to embedded systems or to complex automatic fail-safe control systems—of a supervisor circuit (watchdog) that periodically checks whether the main processor is working and, if not, produces a general reset of the system, the general reset typically involves losing the state of the system at the moment of the block and therefore losing user data. In the case of a "self-scanning shopping" system, this would mean for the customer a loss of shopping data, which has an extremely negative impact since it is very annoying for the customer.

In order to avoid this, the automatic restore from blocks of the main processor of the customer terminal according to the invention is advantageously implemented in combination with an automatic restore of the shopping session from a memory location independent from the restore, be it local in the customer terminal and not subject to deletion during the resetting of the processor or remote in a data processing system with which the customer terminal is in communication, typically in wireless communication.

In the present description and in the attached claims, under the term "data processing system" it is meant to indicate a single remote processor or a plurality of processors and possible peripherals, including access points, routers, etc., connected in a cabled, wireless or mixed network, including Internet.

In one aspect the invention concerns a customer terminal of a "self-scanning shopping" system, the system being configured to store at least one shopping session in a non volatile memory, the customer terminal comprising:
  a main processor,
  a product code reader, and being characterised in that it further comprises:
a location for non volatile storage of an open shopping session indicator and/or an identifier, either direct or indirect, of a shopping session, and
a supervisor circuit, and
in that in a working operating state, the main processor is configured to periodically send a heartbeat to the supervisor circuit,
and in that the supervisor circuit is configured to command a reset of the main processor when, from the lack of receipt of the heartbeat, it detects a non working operating state of the main processor,
and in that the main processor is configured, upon reset, to check whether there is an open shopping session based on the content of said memory location and in the affirmative case to restore said shopping session.

In the present description and in the attached claims, under the term "product code" it is meant to indicate an optical code such as barcodes, stacked codes, two-dimensional optical codes, colour codes; a magnetic code; or an electronic code, such as RFID tags. The expression "optical code" further comprises graphical representations that can be detected not only in the field of visible light, but also in the range of wavelengths comprised between infrared and ultraviolet. The code reader of the customer terminal has corresponding reading means and, optionally, means for writing and/or modifying magnetic and/or electronic codes. The term "scanning" as used herein shall no way be taken to be limited to sweeping an optical code with a light beam.

In the present description and in the attached claims, under the term "shopping session" it is meant to indicate at least one item of data coinciding with and/or correlated to the product code of all of the products selected for purchase by a customer.

In the present description and in the attached claims, under the term "processor" a multipurpose programmable device is meant that accepts digital data as an input, processes them according to instructions stored in its memory and supplies results as an output. It is a component that incorporates the functions of a Central Processing Unit (CPU), preferably in a single integrated circuit or at most in a few circuits.

In the present description and in the attached claims, under "reset of the main processor" it is meant restoring the default content of registers and executing a predetermined sequence of startup instructions (or "bootstrap"), stored in a predetermined location of non volatile memory.

Under "restoring the shopping session" it is meant to indicate that the processor restores the state of the shopping session existing just before the block and in particular it supplies again to the customer the last indication that he/she had been given, in particular the price of the last product selected for purchase.

The heartbeat periodically sent from the main processor to the supervisor circuit can be a pulse signal on a dedicated line, the change in state of a line, etc. The supervisor circuit can comprise a timer or other hardware or software device that is reset at every heartbeat and that indicates whether a predetermined maximum time has passed.

The supervisor circuit can be a second processor, preferably much smaller and more cost-effective than the main processor. Alternatively, the supervisor circuit can be a FPGA (Field Programmable Gate Array) or a CPLD (Complex Programmable Logic Device) or a discrete component circuit.

Since it is an extremely simple device that carries out very simple operations and sustains a light workload, the supervisor circuit is much less at risk of blocking with respect to the main processor. However, when the supervisor circuit is a second processor, it can be provided that it periodically emits heartbeats in turn and that the main processor in turn detects said heartbeats and, in their absence, commands a reset of the supervisor circuit.

DETAILED DESCRIPTION

In one embodiment, the main processor is configured to automatically restore from software application blocks, such as infinite loops, conflicts between components, waiting for an event that never happens, deadlocks, etcetera.

Preferably, the process of the main processor that manages the periodic sending of heartbeats has a low priority assigned thereto, lower than that of the processes managing the application programs of the customer terminal. In this way, this process is blocked also by a software block in an application having a higher priority assigned thereto. In this way it is possible to give the customer terminal a further automatic restore capability from a software block situation.

Preferably, said shopping session comprises a list of product data selected for purchase by a customer, coinciding with and/or correlated to the respective product codes, in particular the relative prices. Other data can comprise the name of the product, the weight, the calorie content, special offers linked to its purchase, collection points, recipes that can be made with it, etc.

Preferably, said shopping session is stored in a data processing system of said "self-scanning shopping" system, said terminal having a communication interface with said data processing system, the main processor in a working operating state being configured to send to said data processing system, via said communication interface, the product codes and/or the product data as they are added to or removed from the shopping session.

With the sending to the data processing system of the codes and/or product data as they are added to the shopping session, in the case of resetting of the main processor following a block, at most the code and/or the data relating to the last added product is lost.

In addition to the aforementioned advantages, the storage at the data processing system of the shopping session can also allow it to be restored, even if not automatically, in a replacement customer terminal in the case of an irreparable physical failure of the customer terminal.

In this embodiment, said location for non volatile storage preferably comprises a unique identifier of the shopping session as a direct identifier.

Alternatively or in addition, said location for non volatile storage comprises a customer identifier and/or a terminal identifier as indirect identifier of the shopping session. In this case, the correlation between the customer identifier and/or terminal identifier and the shopping session identifier takes place in the data processing system.

The unique shopping session identifier and the customer identifier also act as an open session indicator, since such an identifier is stored in the non volatile location only when a shopping session is opened and is deleted when the shopping session is closed.

Vice-versa, the terminal identifier is preferably stored in the non volatile location together with an open session indicator.

In these cases, when the terminal is restored it is able to recognize whether it has an open shopping session and it is preferably configured to request restore from the data processing system only in the affirmative case.

If, on the other hand, the non volatile location only comprises the terminal identifier, the terminal is configured to request a possible restore from the data processing system in any case after the reset, and the check that a shopping session associated with such a terminal identifier is open must be carried out in the data processing system.

In other embodiments, said shopping session is stored in a non volatile memory of the customer terminal.

In both of the aforementioned embodiments, the customer terminal can comprise a volatile local memory to store said at least one shopping session, for example for redundancy or to speed up some display operations to the customer.

In this case, the main processor is further configured to copy said shopping session in said volatile local memory immediately after reset.

Preferably, the customer terminal further has a user interface and the main processor is configured to output, a waiting message on the display or a short advertising message to the user, upon reset. In this way, the block of the customer terminal can be made even more tolerable for the customer.

Preferably, the customer terminal is further configured to receive from the data processing system, via the communication interface, said data relating to a product a code of which has been read. This has the advantage of not having to keep databases of the products of all of the terminals updated.

Alternatively, said data can be stored in the customer terminal.

Preferably, the customer terminal further has a user interface to output to the user said data relating to the product and/or cumulative information of the shopping session and/or other information, such as the closing time of the shopping site, advertising slogans, news, point collection rewards, etc.

Preferably, the user interface is configured to further allow the input of one or more commands among: a code reading command, a purchase accept command, a current purchase delete command, a delete command of a previously validated purchase, a command requesting the total price of the products of the shopping session, a command requesting the sum of the weights of the products of the shopping session (so as to avoid arriving at the checkout with a weight that, once transferred from the trolley to carrier bags, is much greater than what is wanted), a command requesting the sum of the loyalty points from the shopping session and/or already accumulated, etcetera.

Preferably, the customer terminal is portable and/or has means for fixing to a shopping trolley or basket.

In a second aspect the invention concerns a self-scanning shopping system comprising:
  at least one customer terminal as mentioned above,
  a data processing system comprising at least one processor, and
  mating communication interfaces between the data processing system and said at least one customer terminal.

Preferably, the data processing system further comprises a memory for storing said shopping session, said data processing system being configured to receive, from said at least one customer terminal and via the mating communication interfaces, product codes and/or product data and store them in said shopping session.

Preferably, said product codes and/or product data are sent from said terminal to said data processing system one by one.

Preferably, the data processing system comprises at least one product database comprising records linking a product code with product data.

Preferably, the data processing system is configured to receive, from said at least one customer terminal and via said communication interface, a product code and to transmit to said at least one customer terminal, via said communication interface, at least one item of product data linked to said product code. In this way, the database of the product data is only kept globally, for which reason it is not necessary to keep local databases up-to-date in all terminals.

The data processing system can be configured to store at least one data structure linking a customer terminal identifier and/or a customer identifier with a respective shopping session identifier.

In a more general aspect, the invention concerns a customer terminal for "self-scanning shopping", comprising a main processor and a product code reader, characterised in that it further comprises a supervisor circuit, and in that the main processor in a working operating state is configured to periodically send a heartbeat to the supervisor circuit, and in that the supervisor circuit is configured to command a reset of the main processor when, from the lack of receipt of the heartbeat, it detects a non working operating state of the main processor.

BRIEF DESCRIPTION OF THE DRAWINGS

Further features and advantages of the invention will become clearer from the following description of an example embodiment thereof, made with reference to the attached drawings, wherein.

Figure 1:
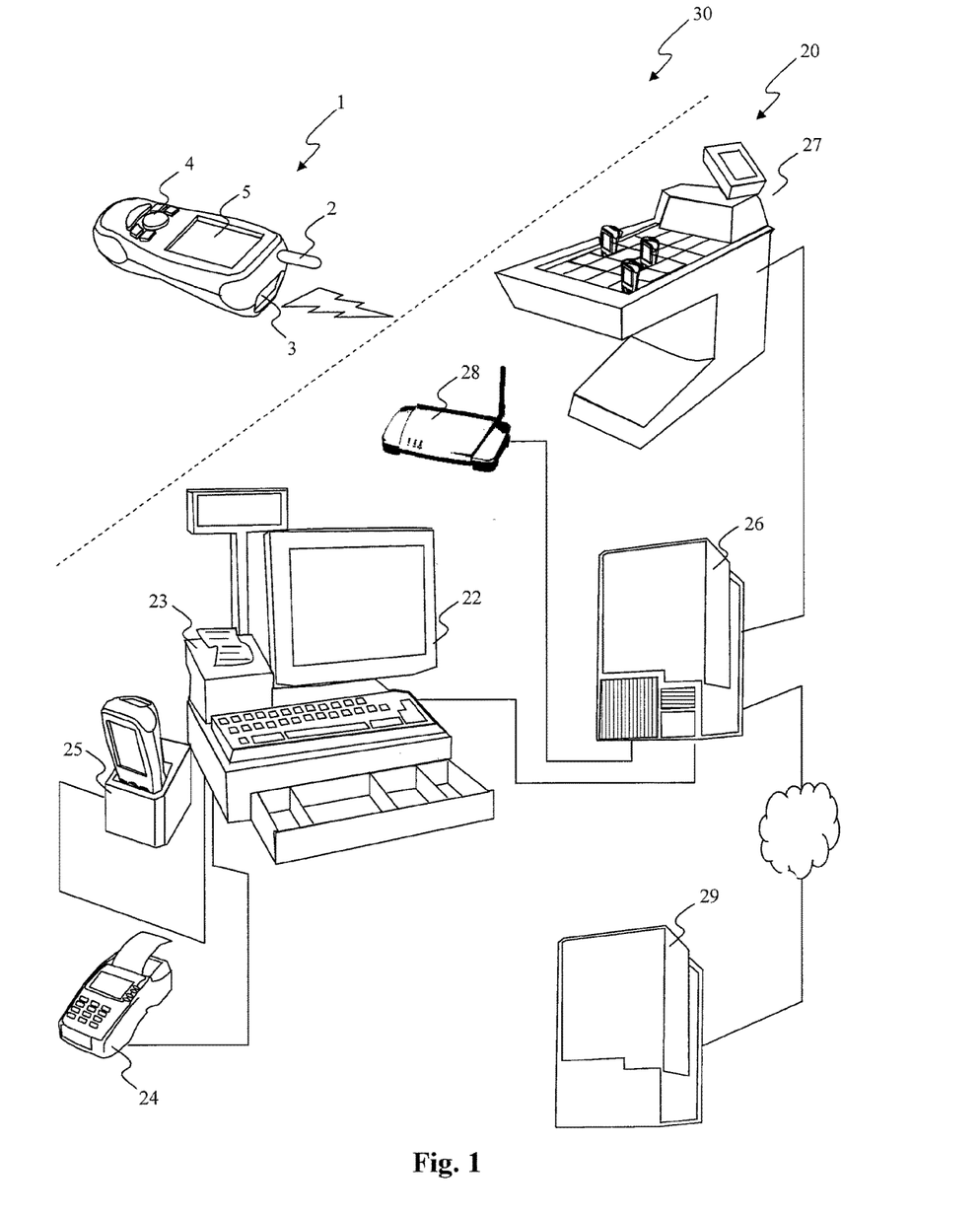
FIG. 1 schematically illustrates a "self-scanning shopping" system according to the invention.
Figure 2:
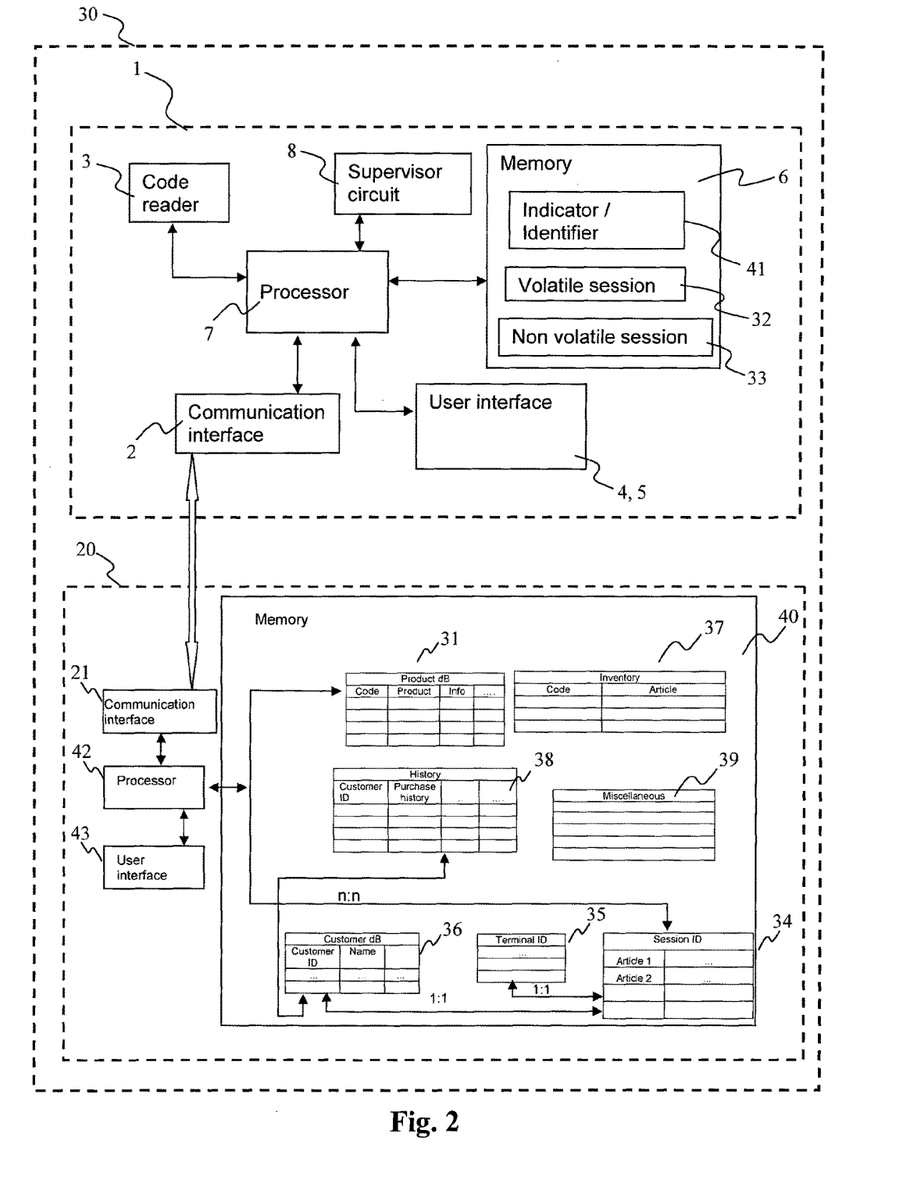
FIG. 2 is a block diagram of the main components of a "self-scanning shopping" system according to the invention.

FIGS. 1 and 2 totally schematically illustrate an example embodiment of a "self-scanning shopping" system 30 according to the invention.

The "self-scanning shopping" system 30 according to the invention is configured for use in a shopping site wherein each product on sale, or at least most of them, has one or more product codes associated thereto.

The product codes can comprise optical codes such as barcodes, stacked codes, two-dimensional optical codes, colour codes; magnetic codes; or electronic codes, such as RFID tags.

Said product codes identify the product and are linked to product data, above all to the sale price, so that the reading of the product codes of all of the products selected for purchase by a customer allows the calculation of the total owed to the shopping site.

First, the "self-scanning shopping" system 30 according to the invention comprises at least one terminal 1.

The number of terminals 1 is proportional to the size of the shopping site: it should be understood that it is advisable to have a terminal 1 with charged battery for each customer in the peak hours.

The terminal 1 is equipped with at least one communication interface 2 with a data processing system 20.

The at least one communication interface 2 preferably comprises a wireless interface and more preferably using radio waves, and/or an infrared, cabled or with contacts interface. Just as an example, FIG. 1 depicts an antenna 2 of a radio communication interface.

The terminal 1 is equipped with a code reader 3. The code reader 3 can be configured for reading optical, magnetic and/or electronic codes, according to the product codes of the products on sale. Only as an example, FIG. 1 depicts a window 3 for the entry and exit of light of an optical code reader.

The terminal 1 preferably has a user interface 4, 5 for inputting commands and/or presenting information. Just as an example, FIG. 1 depicts a plurality of buttons and/or levers 4 and a display 5.

Besides the display 5 there could for example be a beeper and/or a loud-speaker, optionally associated with a speech synthesis system.

Alternatively or in addition to the buttons and/or levers 4, a touch screen or voice command recognizer or a command interface through codes of the same type as the product codes could be used.

The terminal 1 can be of any shape, but preferably it is easily handheld so as to be portable. Alternatively or in addition, the terminal 1 can have means for removably or irremovably fixing to a shopping trolley or basket.

The configuration of the data processing system 20 with which the terminal 1 is in communication also depends on the size of the shopping site. It can comprise a single processor, or a plurality of processors and possible peripherals, including so-called access points, routers etc. connected in a cabled, wireless or mixed network, including Internet.

Just as an example, FIG. 1 illustrates a cash desk 22, typically equipped with a printer 23 of a physical cash slip, a bank card reader 24 and a cradle 25 for housing a customer terminal 1; a central computer 26 of the shopping site; a dispenser 27 suitable for storing and charging the battery of the portable terminals 1, as well as preferably for managing the assignment of a terminal 1 to every customer; an access point 28; a central computer 29 of the chain to which the shopping site belongs, for example connected to the central computer 26 of the shopping site via Internet.

As stated, according to the size of the shopping site several cash desk, several access points, several dispensers and/or several local computers connected in a network can be provided.

At least one of such components of the data processing system 20 is equipped with a communication interface 21 mated with that/those of the customer terminal 1. Preferably, a radio communication interface 21 is embodied in the or in every access point 28 and/or in the central computer 26, while an infrared, cabled or with contacts communication interface 21 is made in the dispenser 27 and in the cradle 25 of the cash desk 22.

First, in the "self-scanning shopping" system 30 according to the invention, there is a data structure linking the product codes with product data, hereinafter indicated as product database 31. The product data typically comprises the price of the product and alternatively or in addition can comprise the weight, the calorie content, special offers linked to its purchase, points of a point collection, recipes that can be made with it etc.

The product database 31 is preferably stored in the data processing system 20 as shown in FIG. 2, in a single copy, for example in the central computer 26 of the shopping site. Every time a product code is read on a product selected for purchase, the customer terminal 1 accesses the product database 31 via the mating communication interfaces 2, 21, obtaining the product data linked to the code read. This solution can be preferable because it ensures that the customer terminals 1 always have the updated data.

Alternatively, the product database 31 can be downloaded into each customer terminal 1, in this case indicated as "batch terminal", through the mating communication interfaces 2, 21, and periodically updated for example by the dispenser 26 during the charging of the battery of the customer terminal 1. Vice-versa, this solution can be preferable where it is not possible to have or it is wished to avoid substantially continuous communication between the terminal 1 and the data processing system 20.

Preferably, the price of the product the code of which has been read is immediately displayed on the display 5 of the terminal 1, and the customer can have the option of confirming or refusing the product for purchase through suitable commands inserted with the buttons 4.

In this way, it is possible, at least in principle, to get rid of the price labels on the shelves, with substantial savings in cost and time of employees in case of changes.

Preferably, moreover, the total of the purchases is displayed on the display 5 of the customer terminal 1, automatically when a code is read and/or upon confirmation or refusal of the purchase and/or upon request from the customer through the buttons 4.

The total can be calculated each time or simply stored in a register of the terminal 1, which is increased with each reading of code of a product selected for purchase, and possibly confirmed where confirmation is necessary. Alternatively, the total is provided by the data processing system 20 through the mating communication interfaces 2, 21 whenever it is necessary to indicate it to the customer, for example on the display 5.

Preferably, the capability of carrying out a second reading of the code of a product is also provided, to remove it from the trolley or basket and subtract the cost thereof in case the customer changes his/her mind on buying it at a later time.

Preferably, in the "self-scanning shopping" system according to the invention a list of the product codes of the products selected for purchase by a customer and/or of the product data linked thereto of a shopping session, in particular the price, is kept in at least one memory location. It should be understood that what is described with reference to such a list also applies in the case of keeping just the total, or additionally to the total, of one customer's purchases.

This information, in short called "shopping session" herein, can be stored as a local session 32 in a volatile memory of the terminal 1, as a local session 33 in a non volatile memory of the terminal 1 and/or as a remote session 34 in a memory of the data processing system 20.

Preferably, the current shopping session is stored as a remote session 34. This has the advantage that, since it has no space and weight restrictions, it is possible to use data supports that are highly reliable even in the case of a very great number of accesses for reading and writing.

The local session 32 in volatile memory can be used above all as buffer memory, to avoid continued accesses to the local non volatile memory 33 and/or in case the communication through the mating communication interfaces 2, 21 is temporarily unavailable, especially when the communication is wireless and/or in the case of a central computer 26 occupied by too many requests from the various customer terminals 1.

The shopping session 33 in local non volatile memory may be advantageous in the case of "batch" terminals wherein the entire product database is stored, and/or in case there is not substantially continuous communication with the data processing system 20.

Preferably, a memory location 41 in the customer terminal 1 stores an open shopping session indicator and/or a direct or indirect identifier of the open shopping session, as described more clearly hereinafter.

The data processing system 20 preferably has a data structure 35 containing codes identifying the various terminals 1 and/or a data structure 36 containing identifiers of regular customers and/or their data, for example anagraphical data, expressed preferences, etcetera.

Upon entry in the shopping site, the customer receives a terminal 1. The terminal 1 can be already attached to the shopping trolley or basket, given out by an employee or, preferably, it is taken from the dispenser 27 without the intervention of attendants.

In this step it is possible to provide for the customer to be identified, for example through an electronic or magnetic card or through credentials or through biometric authentication or in another way.

In this case, some information on the customer can be recovered from the data structure 36 of regular customers. For example, the "self-scanning shopping" system can send targeted information to the customer such as his/her collection points total, special nutritional information, promotions, etc.

With the association between the customer and the terminal 1, even just through the delivery of a terminal to an "anonymous" customer, a new shopping session 32-34 is in any case opened.

In order to distinguish the shopping sessions of the various customers present simultaneously in the shopping site, especially when they are stored in the data processing system 20, the "self-scanning shopping" system 30 can use the identifier of the terminal and therefore link the shopping session 34 with an element of the data structure 35 and/or it can use an identifier of the customer and therefore link the shopping session 34 with an element of the data structure 36 and/or it can use a truly unique session identifier, for example assigning a progressive number to every shopping session, independently from the terminal and from the customer for which it is opened.

The terminal identifier and the customer identifier are therefore indirect identifiers of the shopping session.

In FIG. 2 the aforementioned links are shown in a totally schematic manner and just as an example by two-directional arrows.

As far as the customer terminal 1 is concerned, it can store the respective terminal identifier in substantially permanent form and/or in temporary form an open session indicator and preferably the customer identifier and/or the session identifier received at the moment of the association with the customer from the data processing system 20, preferably from the dispenser 27.

Said information is stored in the customer terminal 1 in the location 41 in a non volatile manner and, in the case of storage of the terminal identifier, it is possible to use a "hardware" storage through a set of encoding pins, as is known in the field. Such a set of encoding pins is therefore encompassed within the meaning of the term "location of non volatile memory" as used herein.

While in the shopping site, the customer reads, through the reader 3, the codes of the products that he/she selects for purchase, and the "self-scanning shopping" system 30, besides showing the price and/or the total as mentioned above, keeps the list of the relative codes, prices and/or correlated data, or even just the total price, as shopping session 32-34. The shopping session 32-34 is of course updated "in negative" also in the case of subsequent release of a product.

At the exit from the shopping site, the shopping session 32-34 is closed, the customer settles the amount owed and the terminal 1 is freed for another customer.

Alternatively, the terminal 1 can be given practically permanently to a regular customer, and taken home by him/her, for example to also use it to make remote orders by reading the codes from a catalogue.

The total owed can be simply read directly from the display 5 of the terminal 1, but typically a cash slip is emitted, preferably a fiscal receipt printed by the printer 23 of the cash desk 22, containing the list of products and relative costs.

In this step of closing the shopping session, if a remote shopping session 34 is kept, the data processing system 20 is suitably informed that the shopping session has ended and removes the possible correlations with the terminal and/or customer identifier; the customer terminal 1 zeroes the open session indicator and/or the customer and/or session identifier from the location 41.

If just or also the shopping session 32 or 33 is kept in the terminal 1, the entire shopping session is preferably loaded into the data processing system 20 and deleted from the terminal 1.

If the shopping session is stored both in the terminal 1 (shopping session 32 or 33) and in the data processing system 20 (shopping session 34), there can be a comparison between them, for example to highlight any corrupted data during transmission using a radio interface 2, 21, for example due to interference.

Furthermore, for example if the customer is not a regular or is suspected for some reason or just chosen, randomly, there can be a check of the shopping trolley or basket with the reading of the product codes by an attendant, the shopping session 32-34 built up by the customer while in the shopping site serving for comparison or being ignored.

The possible loading of the shopping session 32 or 33 from the customer terminal 1 to the data processing system 20 takes place through the mating communication interfaces 2, 21, preferably by arranging the terminal 1 in the cradle 25 at the cash desk 22, or in a housing of the dispenser 27, and using the infrared, cabled or with contacts communication interface.

After payment and closing, the shopping session 32-34 preferably is not discarded, rather used for the purposes of monitoring the warehouse stock and/or for accounting purposes, as exemplified by an inventory data structure 37 and/or for statistical purposes, for example storing the list of products or some information derivable therefrom in a history data structure 38, which may or may not be divided by customer.

Preferably, the user interface 4, 5 also makes it possible to display, in a timed fashion or through simple combinations of buttons, the other information linked to the product and/or not linked to the product, such as the nutritional content, recipes that can be made, the closing time of the shopping site, advertising slogans, news, rewards of a point collection, etc.

Just as an example, FIG. 2 represents a data structure 39 containing said information not linked to the product.

The various data structures 31 and 34-39 of the data processing system 20 described above are depicted as being all stored in a memory 40, but as stated above FIG. 2 is an absolutely schematic representation and in practice they can be spread over various memories of various components of the data processing system 20.

For example, typically the inventory data structure 37 and the data structure 39 of various information are not part of the application dedicated to the "self-scanning shopping".

Similarly, just as an example, in addition to the communication interface 21 with the terminal 1, just a processor 42 and just an interface with the user 43 are shown of the data processing system 20, but typically each component 22, 26-29 of the data processing system 20 will have its own processor and its own interface with the user.

Also FIG. 2 shows the components described above of the terminal 1: at least one code reader 3, a user interface 4, 5, at least one communication interface 2 with the data processing system 20, and a memory 6, suitable, as stated above, for storing a shopping session 32, 33 and/or in the location 41 an open session indicator and/or an identifier of a shopping session stored remotely (direct identifier or actual session identifier, or indirect identifier or customer and/or terminal identifier).

The memory 6 of the reader is further configured to store constants, variables and program instructions for a processor 7 that, once executed, allow the control of the components of the terminal 1 to carry out the functions described herein.

Therefore, it should be understood that the memory 6 in the block diagram of FIG. 2 can correspond to more than one physical storage device, like for example: a RAM, a ROM, an SD card, a NAND memory, a flash card etc., as well as possibly a set of pins for hardware encoding of a terminal identifier.

The processor 7, besides managing the aforementioned components of the terminal 1, is configured according to the invention to periodically send a heartbeat comprehensible by a supervisor circuit 8 of the portable terminal 1.

The heartbeat periodically sent from the main processor to the supervisor circuit 8 can be a pulse signal on a dedicated line, the change in state of a line etc.

The supervisor circuit 8 is configured to command a reset of the main processor 7 when, from the lack of receipt of the heartbeat, it detects a non working operating state of the main processor 7.

Such a non working operating state of the main processor 7 can be caused by a so-called "hardware block", namely a malfunction at the BIOS and/or kernel level of the operating system, which the main processor 7 is unable to overcome by itself.

An operating state of the main processor 7 and therefore of the terminal 1 not perfectly working can however also be caused by a "software block", namely the block of an application running in the main processor 7, in particular of the "self-scanning shopping" application.

Such a "software block" can for example occur due to an incorrect sequence of commands by the customer, an infinite loop due to a programming bug, a conflict between components of the reader, for example between the code reader 3 and the communication interface 2, waiting for an event that never happens, a deadlock (two processes each waiting for the other to finish a certain action), etcetera.

In a "self-scanning shopping" application, wherein the users of the terminal 1 are vastly different and are not familiar with the terminal 1 itself, it may be particularly important to provide for automatic recovery, namely without the intervention of the attendant, also from such a software block.

According to the invention it is preferably provided for the process of the main processor 7 that manages the periodic sending of heartbeats to the supervisor circuit 8 to be assigned a low priority, lower than that assigned to the processes that manage the applications such as the reading of codes through the reader 3, the management of the interface 4, 5 with the user and the management of the communication with the data processing system 20.

In this way, the process that manages the periodic sending of heartbeats to the supervisor circuit 8 is blocked also by a software block in such an application, causing the reset of the main processor 7 by the supervisor circuit 8.

The supervisor circuit 8 comprises a timer or other hardware or software device that is reset at every heartbeat and that indicates whether a predetermined maximum time has passed.

The supervisor circuit 8 can be a second processor, preferably much smaller and more cost-effective than the main processor 7.

In an alternative, the supervisor circuit can be a FPGA (Field Programmable Gate Array) or a CPLD (Complex Programmable Logic Device).

A CPLD can have the advantage of keeping the programming even in the absence of a power supply, since it can contain a non volatile memory, or it can have the property, in case the internal memory of the CPLD is a volatile one, of first upon waking up reading the content of an external flash memory where the program to be executed is located.

On the other hand, an FPGA reads the data from an external flash memory, or it is reprogrammed by the main processor 7 upon restart after a crash; usually FPGAs do not have internal flash memories.

Figure 3:
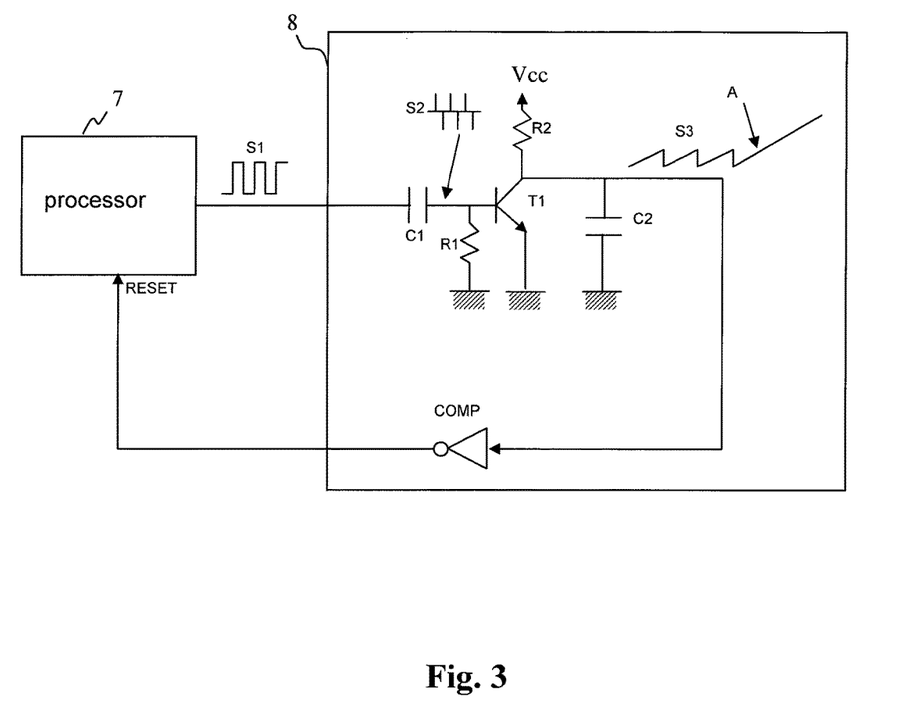
FIG. 3 is a circuit diagram illustrating an embodiment with discrete components of a supervisor circuit.

In another alternative embodiment, the supervisor circuit 8 is made without processors or programmable devices, rather only with cabled electronic elements. An embodiment of such a supervisor circuit 8 with discrete components is shown in FIG. 3.

In such an embodiment of the supervisor circuit 8, the processor 7 sends, as a heartbeat, a square wave signal S1, which a first capacitor C1 connected in series to a resistor R1 transforms into a train of pulses S2. The train of pulses S2 is applied to the base of an npn transistor T1. A second capacitor C2 is charged by a voltage Vcc through a second resistor R2 connected in series. The second capacitor C2 is also connected to the collector of the transistor T1, for which reason upon every pulse of the train of pulses S2, the second capacitor C2 discharges through the transistor T1. The progression of the charge S3 on the second capacitor is sawtooth-shaped. If the pulse of the train of pulses S2 does not arrive for a certain time period, the charge S2 on the second capacitor C2 exceeds a threshold value, as shown downstream of point A. Such exceeding of the threshold is detected by a threshold comparator COMP, the output of which commands the reset pin of the main processor 7.

Upon reset of the main processor 7, caused by the supervisor circuit 8 in one of its aforementioned embodiments, the main processor 7 restores the default content of registers and executes a predetermined sequence of startup instructions (or "bootstrap"), stored in a predetermined non volatile location of the memory 6.

Among these instructions, the main processor 7 restores communication capability through the interface 2 and starts up the "self-scanning shopping" application.

The main processor 7 then checks, based on the content of the location 41 of non volatile memory and as described more clearly hereinafter, whether there is an open shopping session.

The non volatile memory location 41 can be made, alternatively or in addition to the aforementioned set of pins encoding the terminal identifier, in an internal memory of the main processor 7 or of the processor or device implementing the supervisor circuit 8, or in an external memory managed by the main processor 7 or by the processor or device implementing the supervisor circuit 8.

In case there is an open shopping session, the processor 7 restores the state existing just before the block and in particular provides the customer, for example through the display 5, with the last indication that it had provided him/her, in particular the price of the last product selected for purchase.

The customer practically does not notice any disturbance, apart from at most the lack of operativity for a few moments and the need to read the last product code again, in case the block occurred during such reading. The self-scanning shopping system could even keep track, in the shopping session, of the additional information (for example advertising or recipes) that are transmitted, so as to also restore them in the case of a block.

In case the shopping session is stored as shopping session 33 in the local non volatile memory, preferably together with an open session indicator stored in location 41, then after reset the terminal 1 is immediately operative and has the last information to be provided again to the customer available. It may be necessary, at most, to re-compute the current total of the prices of the products, in case this data is kept in a variable in a volatile memory location.

In case the "self-scanning shopping" system stores the remote shopping session 34, then as soon as it has restored its functionality upon reset, the main processor 7 takes care of restoring the current shopping session by downloading the last information from the data processing system 20 through the mating communication interfaces 2, 21.

Preferably, the customer terminal 1 sends to the data processing system 20 a suitable request (recovery request message), provided with the session identifier stored in location 41. If this is not the direct identifier (actual session identifier), rather it is an indirect identifier such as the customer and/or terminal identifier, the data processing system 20 provides for checking whether there is the shopping session or identifies it based on the correlation between the shopping sessions and the customer and/or terminal identifiers.

Furthermore it can also be provided for a copy from the shopping session 33 in the non volatile memory or from the remote shopping session 34 to the shopping session 32 in the volatile memory in case this is also kept, for example for redundancy or to speed up some display operations to the customer.

More specifically, the existence of an open shopping session is directly indicated by a customer and/or shopping session identifier stored in the memory location 41, or, in case a terminal identifier is stored in memory location 41, the existence of an open shopping session can be indicated by a suitable indicator as stated above. Furthermore, the terminal identifier can be transmitted through the communication interface 2 to the data processing system 20, which will check whether there is an open shopping session.

During the copy of the shopping session between the non volatile memory location 33 and the volatile memory location 32 or during download from the data processing system 20, it can be provided for outputting a waiting message on the display 5 of the terminal 1, which informs the customer that the terminal 1 is recovering the data, or a short advertising message, thus making the block of the terminal 1 even more tolerable for the customer.

Only in the case of an irreparable failure, for example a mechanical failure from falling, or in case the battery of the terminal 1 runs out while the customer is in the shopping site, is it necessary for the customer to return the terminal 1 to the dispenser 27 or to the attendant in order to replace it.

In case the "self-scanning shopping" system 30 stores the remote shopping session 34, then it is possible to restore the current shopping session in the replacement customer terminal, storing in the location 41 the respective customer or session identifier, or associating the open shopping session in the data processing system 20 with the new terminal identifier.

It is worthwhile emphasising that, since it is an extremely simple device that carries out very simple operations and sustains a light workload, the supervisor circuit 8 is much less subject to the risk of block than the main processor 7. However, when the supervisor circuit 8 is a second processor, it can be provided for it to periodically emit heartbeats in turn and for the main processor 7 to detect in turn said heartbeats and, in their absence, to command a reset of the supervisor circuit 8.

In this way, the two components 7, 8 supervise each other and manage blocks of each other. It is worthwhile emphasising that the possibility of a simultaneous block of the two components 7, 8 is the product of two events that are already per se rare, for which reason the customer terminal 1 of the invention is much safer, and above all independent from software.

What is claimed is:

1. A customer terminal of a self-scanning shopping system, the system being configured to store at least one shopping session in a non volatile memory, the customer terminal comprising:
   a main processor;
   a product code reader;
   a memory location for non volatile storage of an open shopping session indicator and/or an identifier, either direct or indirect, of a shopping session; and
   a supervisor circuit,
   wherein in a working operating state, the main processor is configured to periodically send a heartbeat to the supervisor circuit,
   wherein the supervisor circuit is configured to command an automatic reset of the main processor when, from the lack of receipt of the heartbeat, it detects a non working operating state of the main processor, and
   the main processor is configured, upon reset, to check whether there is an open shopping session based on the contents of said memory location, and in the affirmative case to automatically restore said shopping session,
   wherein the main processor is configured such that management of the periodic sending of heartbeats has a lower priority assigned thereto than management of an application program of the customer terminal, whereby the periodic sending of heartbeats by the main processor is blocked by a software block in the application program.

2. The terminal according to claim 1, wherein the supervisor circuit is selected from the group consisting of a second processor, an FPGA (Field Programmable Gate Array), a CPLD (Complex Programmable Logic Device), and a discrete component circuit.

3. The terminal according to claim 1, wherein the supervisor circuit is a second processor configured to periodically emit second heartbeats, and wherein the main processor is configured to detect said second heartbeats and, in their absence, command a reset of the supervisor circuit.

4. The terminal according to claim 1, wherein the main processor is configured such that management of the periodical sending of heartbeats has a lower priority assigned thereto than management of application programs of the customer terminal.

5. The terminal according to claim 1, wherein said shopping session is stored in a data processing system of said self-scanning shopping system, said terminal having an interface for communicating with said data processing system, the main processor in a working operating state being configured to send to said data processing system, via said communication interface, product codes and/or product data as they are added to or removed from the shopping session.

6. The terminal according to claim 5, wherein said location for the non volatile storage comprises a unique identifier of the shopping session as a direct identifier.

7. The terminal according to claim 1, further comprising a user interface and wherein the main processor is configured to display a waiting message or a short advertising message to user upon reset.

8. A self-scanning shopping system comprising:
at least one customer terminal comprising:
   a main processor;
   a product code reader;
   a memory location for non volatile storage of an open shopping session indicator and/or an identifier, either direct or indirect, of a shopping session; and
   a supervisor circuit,
   wherein in a working operating state, the main processor is configured to periodically send a heartbeat to the supervisor circuit,
   wherein the supervisor circuit is configured to command an automatic reset of the main processor when, from the lack of receipt of the heartbeat, it detects a non working operating state of the main processor, and
   the main processor is configured, upon reset, to check whether there is an open shopping session based on the contents of said memory location, and in the affirmative case to automatically restore said shopping session,
   wherein the main processor is configured such that management of the periodic sending of heartbeats has a lower priority assigned thereto than management of an application program of the customer terminal, whereby the periodic sending of heartbeats by the main processor is blocked by a software block in the application program;
a data processing system comprising at least one processor; and
mating communication interfaces between the data processing system and said at least one customer terminal.

9. The system according to claim 8, wherein the data processing system further comprises a memory for storing said shopping session, said data processing system being configured to receive, from said at least one customer terminal and via the mating communication interfaces, product codes and/or product data and to store them in said shopping session.

* * * * *